(12) United States Patent
Tominaga

(10) Patent No.: US 7,786,924 B2
(45) Date of Patent: Aug. 31, 2010

(54) DVOR APPARATUS AND SIDEBAND ANTENNA FAULT DETECTING METHOD

(75) Inventor: Yasushi Tominaga, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 203 days.

(21) Appl. No.: 11/943,129

(22) Filed: Nov. 20, 2007

(65) Prior Publication Data
US 2008/0158047 A1    Jul. 3, 2008

(30) Foreign Application Priority Data
Dec. 27, 2006    (JP)    ............................. 2006-352718

(51) Int. Cl.
*G01S 7/40*    (2006.01)
*G01S 1/44*    (2006.01)

(52) U.S. Cl. ........................... 342/49; 342/63; 342/173; 342/405

(58) Field of Classification Search ............ 342/49, 342/402, 405
See application file for complete search history.

(56) References Cited

U.S. PATENT DOCUMENTS

| | | | | |
|---|---|---|---|---|
| 3,023,410 | A | * | 2/1962 | Hansel ........................ 342/406 |
| 3,369,238 | A | * | 2/1968 | Stauffer et al. .............. 342/401 |
| 3,818,476 | A | * | 6/1974 | Coulter et al. .............. 342/360 |
| 3,958,244 | A | * | 5/1976 | Lee et al. .................... 342/402 |
| 4,417,250 | A | * | 11/1983 | Grousseau ................ 342/405 |
| 4,434,423 | A | | 2/1984 | Kautz |
| 4,591,861 | A | * | 5/1986 | Kautz ......................... 342/404 |
| 4,954,835 | A | * | 9/1990 | Lanciaux .................... 342/418 |
| 5,086,302 | A | * | 2/1992 | Miller ......................... 342/373 |
| 5,172,124 | A | * | 12/1992 | Becavin et al. .............. 342/360 |
| 5,416,489 | A | * | 5/1995 | Mailloux .................... 342/173 |
| 2007/0115168 | A1 | * | 5/2007 | Honda ........................ 342/173 |

FOREIGN PATENT DOCUMENTS

| | | |
|---|---|---|
| EP | 0 509 694 A2 | 10/1992 |
| JP | 62-225037 | 10/1987 |
| JP | 2-24586 | 1/1990 |
| JP | 3-267803 | 11/1991 |
| JP | 2001-249172 | 9/2001 |

OTHER PUBLICATIONS

U.S. Appl. No. 12/358,730, filed Jan. 23, 2009, Tominaga.
U.S. Appl. No. 11/761,720, filed Jun. 12, 2007, Yasushi Tominaga.

* cited by examiner

*Primary Examiner*—Thomas H Tarcza
*Assistant Examiner*—Matthew M Barker
(74) *Attorney, Agent, or Firm*—Oblon, Spivak, McClelland, Maier & Neustadt, L.L.P.

(57) ABSTRACT

According to one embodiment, a DVOR apparatus includes a main device outputting a radio frequency (RF) signal, a distributor distributing the RF signal output from a main device into a plurality of systems, and sideband antennas radiating the RF signal, wherein, the main device includes a RF signal output unit outputting the RF signal, a measuring unit measuring power levels of reflected waves, a determining unit determining presence or absence of faulty power levels from the measurement results, a generating unit generating selection signals to control selections of outputs of the RF signal for the distributor, a comparison unit comparing the selection signals with the determining results, and a specifying unit specifying faulty sideband antennas and a faulty transmission path of the RF signal among the main device and the distributor from the comparison results.

12 Claims, 4 Drawing Sheets

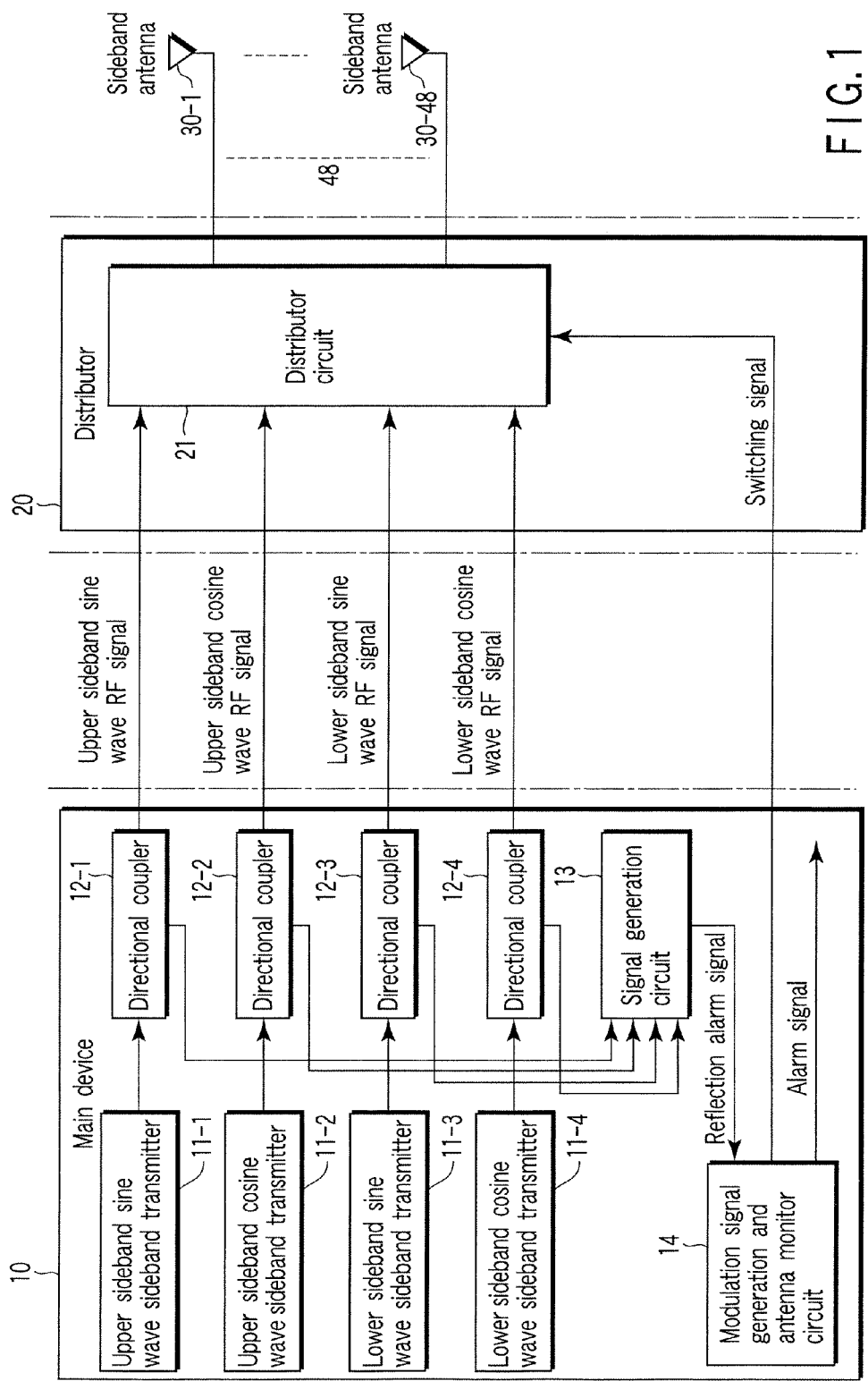
F I G. 1

DVOR APPARATUS AND SIDEBAND ANTENNA FAULT DETECTING METHOD

CROSS-REFERENCE TO RELATED APPLICATIONS

This application is based upon and claims the benefit of priority from prior Japanese Patent Application No. 2006-352718, filed Dec. 27, 2006, the entire contents of which are incorporated herein by reference.

BACKGROUND OF THE INVENTION

1. Field of the Invention

The present invention relates to a Doppler VHF omnidirectional radio range (DVOR) apparatus that is a radio navigation facility, and relates to a sideband antenna fault detecting method to be used for detecting a faulty sideband antenna in the DVOR apparatus.

2. Description of the Related Art

A device which provides direction information from a reference point, namely magnetic north, to an airplane is in general use. An antenna of the DVOR apparatus is composed of a carrier antenna and 48 sideband antennas which are arranged around the carrier antenna as the center. The carrier antenna radiates radio frequency (RF) signals with prescribed phases having no relation to any direction. The sideband antenna radiates RF signals of which the phases vary in accordance with direction. A receiver mounted on the airplane can therefore ascertain the direction from the reference point, namely the DVOR apparatus, at a receiving point by receiving those two types of signals, and comparing them (refer to, e.g., Jpn. Pat. Appln. KOKAI Publication No. 2-24586).

The RF signals radiated from the sideband antennas are output from a main device of the DVOR apparatus. The output timing of the RF signals output to each sideband antenna is switched by a distributor positioned at a place away from the main device. If a fault such as a failure occurs in any of the sideband antennas, the sideband antenna does not radiate the RF signal then the DVOR apparatus cannot fully function. Therefore, a conventional DVOR apparatus has a sideband antenna fault detection function in order to detect a faulty sideband antenna.

The conventional sideband antenna fault detecting function detects reflected waves from the sideband antennas by directional couplers installed in the distributor in the same number as that of the sideband antennas. By monitoring the reflected waves through an antenna monitor circuit also installed in the distributor, the detecting function can detect a faulty sideband antenna. However, adding this function makes the configuration of the distributor extremely complicated. Thus, problems, such that the overall size of the DVOR apparatus becomes large and its manufacturing cost increases, have been posed. For the detection function, cables supplying power sources to drive the antenna monitor circuit, and cables transferring the monitor results of the reflected waves from the antenna monitor circuit outwardly, etc., are necessary, which exacerbates the foregoing problems. Furthermore, if a fault has occurred in the cable transferring the RF signal between the main device and the distributor, this fact poses another problem that the fault occurrence cannot be detected.

As mentioned above, in the conventional DVOR apparatus, since the distributor has to include directional couplers of which the number is same as that of the sideband antennas and the antenna monitor circuit, this has become the main factor inhibiting a decrease in size and manufacturing cost of the DVOR apparatus. If a fault has occurred in the cable transferring the RF signal between the main device and the distributor, it has been impossible for the conventional DVOR apparatus to detect the fault.

BRIEF SUMMARY OF THE INVENTION

According to one aspect of the present invention, there is provided a Doppler VHF omnidirectional radio range (DVOR) apparatus comprising: a main device which selectively outputs a radio frequency (RF) signal; a distributor which distributes the RF signal output from a main device into a plurality of systems; and a plurality of sideband antennas which radiate the RF signal disposed for each of the plurality of systems; wherein, the main device includes: a RF signal output unit which outputs the RF signal; a measuring unit which is disposed in an output system of the RF signal, and measures power levels of reflected waves from the plurality of sideband antennas to the RF signal; a determining unit which determines presence or absence of faulty power levels from the measurement results of the measuring unit; a generating unit which generates selection signals to control selections of outputs of the RF signal for the distributor; a comparison unit which compares the selection signals with the determining results from the determining unit; and a specifying unit which specifies faulty sideband antennas in the plurality of sideband antennas and a faulty transmission path of the RF signal among the main device and the distributor from the comparison results.

Additional objects and advantages of the invention will be set forth in the description which follows, and in part will be obvious from the description, or may be learned by practice of the invention. The objects and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram illustrating a preferred configuration of an embodiment of a DVOR apparatus with a sideband antenna fault detecting function regarding the present invention;

DETAILED DESCRIPTION OF THE INVENTION

Hereinafter, embodiments of the present invention will be described in detail with reference to the drawings.

FIG. 1 illustrates a block diagram showing a schematic configuration of a DVOR apparatus regarding an embodiment of the invention. In the main device 10 depicted in FIG. 1, an upper sideband sine wave RF signal output from an upper sideband sine wave sideband transmitter 11-1, an upper sideband cosine wave RF signal output from an upper sideband cosine wave sideband transmitter 11-2, a lower sideband sine wave RF signal output from a lower sideband sine wave sideband transmitter 11-3, and a lower sideband cosine wave RF signal output from a lower sideband cosine wave sideband transmitter 11-4, are each branched into two systems by directional couplers 12-1 to 12-4 disposed for each system of each sideband transmitter, respectively. One of the RF signals of each system branched into two systems is supplied to a distributor 20, and the other of the RF signals is supplied to a signal generation circuit 13 as progressive waves. The generation circuit 13 measures the power levels of the input progressive waves. A modulation signal generation and antenna monitor circuit 14 installed in the main device 10 supplies switching signals to the distributor 20 to control the switching timing of each RF signal performed by the distributor 20.

Figure 2:
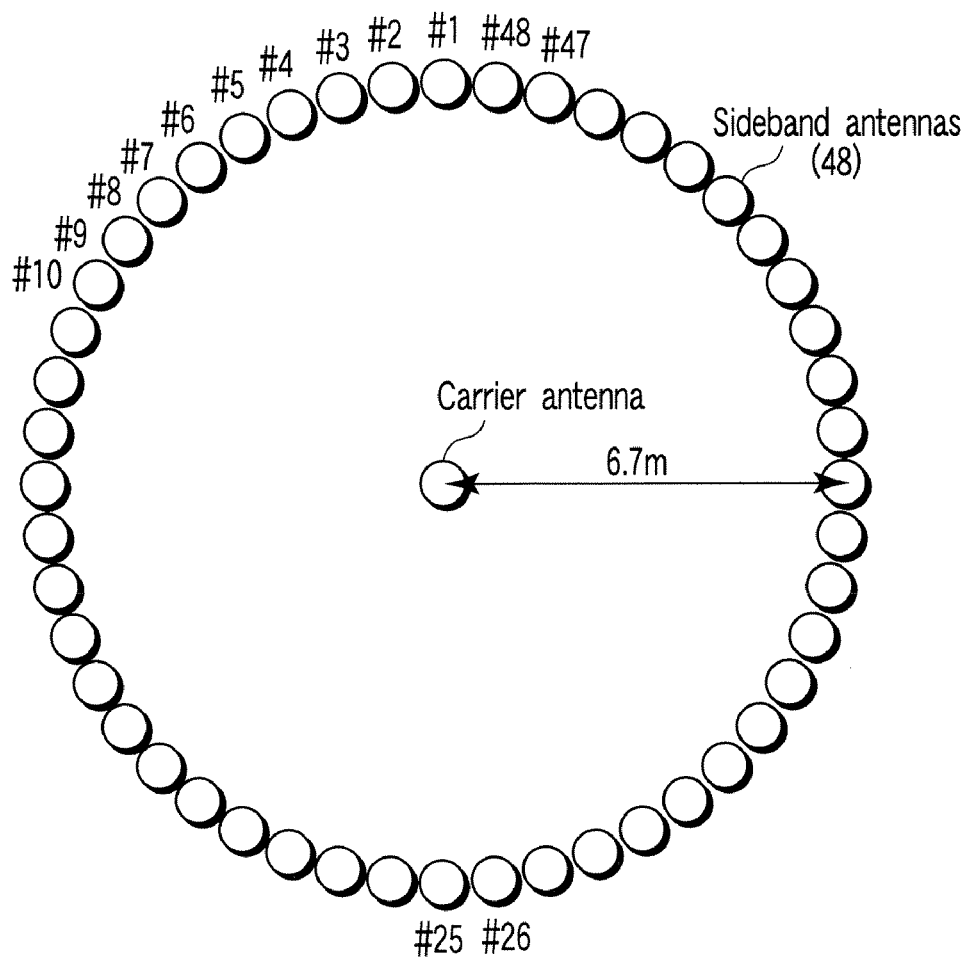
FIG. 2 is a view illustrating a preferred arrangement of carrier antenna and sideband antennas in the embodiment of the invention.

In the distributor 20, the RF signals of four systems supplied from the main device 10 are supplied to 48 sideband antennas 30-1 to 30-48 arranged as depicted in FIG. 2 by switching their timing, by use of a distributor circuit 21. The timing of provision of the RF signals to each sideband antenna 30-1 to 30-48 is controlled by the switching signals from the modulation signal generation and antenna monitor circuit 14. The switching signals depend on a change in a voltage, and the distributor circuit 21 is driven by the voltage.

Each RF signal from the distributor circuit 21 is radiated from the sideband antennas 30-1 to 30-48. At this moment, reflected waves to the supplied RF signals are generated at the sideband antennas 30-1 to 30-48 and, transmitted to the systems from which the RF signals are transmitted. The reflected waves from the sideband antennas 30-1 to 30-48 are detected by the directional couplers 12-1 to 12-4 of the systems in which the reflected waves are transmitted, and supplied to the signal generation circuit 13. The generation circuit 13 measures the power levels of the input reflected waves. The generation circuit 13 generates a reflection alarm signal on the basis of the power levels of the reflected waves and the power levels of the foregoing progressive waves, and outputs the reflection alarm signal to the modulation signal generation and antenna monitor circuit 14. The modulation signal generation and antenna monitor circuit 14 detects a faulty sideband antenna on the basis of the reflection alarm signal from the generation circuit 13, and transmits the alarm signal outwardly.

In this embodiment, the distributor circuit 21 supplies the upper sideband sine wave RF signal and the lower sideband sine wave RF signal to the sideband antennas to which odd numbers shown in FIG. 2 are given, and supplies the upper sideband cosine wave RF signal and the lower sideband cosine RF signal to the sideband antennas to which even numbers shown in FIG. 2 are given. The upper sideband sine wave RF signal and the lower sideband sine wave RF signal are simultaneously supplied, respectively, to the sideband antennas positioned opposite to one another. The upper sideband cosine wave RF signal and the lower sideband cosine wave RF signal are also simultaneously supplied, respectively, to the sideband antennas positioned opposite to one another. The distributor circuit 21 sets a provision time period of the RF signals at one time to $1/720$ second to each sideband antenna. The distributor circuit 21 supplies each sine wave RF signal by 30 times for one second to each sideband antenna given the odd numbers, and supplies each cosine wave RF signal by 30 times for one second to each sideband antenna given the even numbers.

More specifically, when the upper sideband sine wave RF signal is supplied to the sideband antenna 30-1, the lower sideband sine wave RF signal is simultaneously supplied to the sideband antenna 30-25. After $1/720$ second, the upper sideband sine wave RF signal is supplied to the sideband antenna 30-3, and the lower sideband sine wave RF signal is simultaneously supplied to the sideband antenna 30-27. After the next $1/720$ second, the lower sideband sine wave RF signal is supplied to the sideband antenna 30-5, and the lower sideband sine wave RF signal is simultaneously supplied to the sideband antenna 30-29.

Subsequently, in the configuration given above, detection operations of the faulty sideband antenna will be described in detail. At this time, for the convenience of the description, the upper sideband sine wave RF signal output from the upper sideband sine wave sideband transmitter 11-1 will be described.

Figure 3:
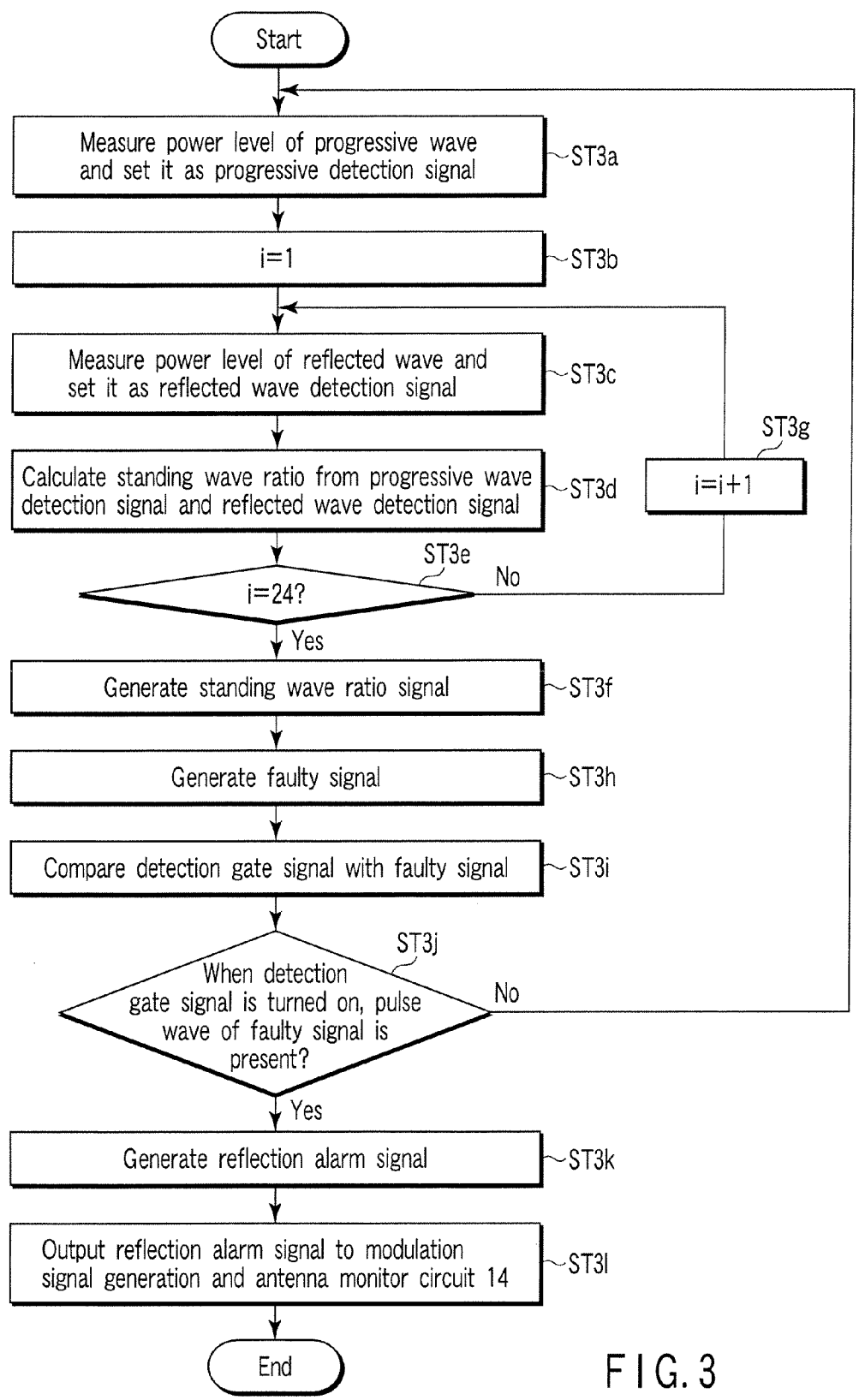
FIG. 3 is a flowchart illustrating preferred processing operations of a signal generation circuit in the embodiment of the invention.

FIG. 3 shows a flowchart showing the processing operations of the signal generation circuit 13 regarding the embodiment of the invention.

The generation circuit 13 measures the power level of one upper sideband sine wave RF signal transmitted from the sideband transmitter 11-1 and branched by the coupler 12-1, and sets it as a progressive wave detection signal (Block ST3*a*).

The branched other upper sideband sine wave RF signal is output to the sideband antennas given the odd numbers by means of the distributor circuit 21, and reflected by these sideband antennas. The reflected signals generated in such a manner are output to the system of the upper sideband sine wave sideband transmitter 11-1, and detected by the coupler 12-1. The generation circuit 13 sets "i=1" (i is natural number) (Block ST3*b*), measures the power level of the RF signal detected through the coupler 12-1, and takes out it as a reflected wave detection signal (Block ST3*c*).

Subsequently, the generation circuit 13 compares the reflected wave detection signal with the progressive wave detection signal to calculate a standing wave ratio (Block ST3*d*). Next, the generation circuit 13 determines whether or not the standing wave ratio is calculated 24 times (Block ST3*e*). If the standing wave ratio is calculated 24 times (Yes, in Block ST3*e*), the generation circuit 13 generates the standing wave ratio signal by using the standing wave ratio (Block ST3*f*). If the standing wave ratio is not calculated 24 times (No, in Block ST3*e*), the generation circuit 13 sets "i=i+1" (Block ST3*g*) to advance to the Block ST3*c*.

Figure 4:
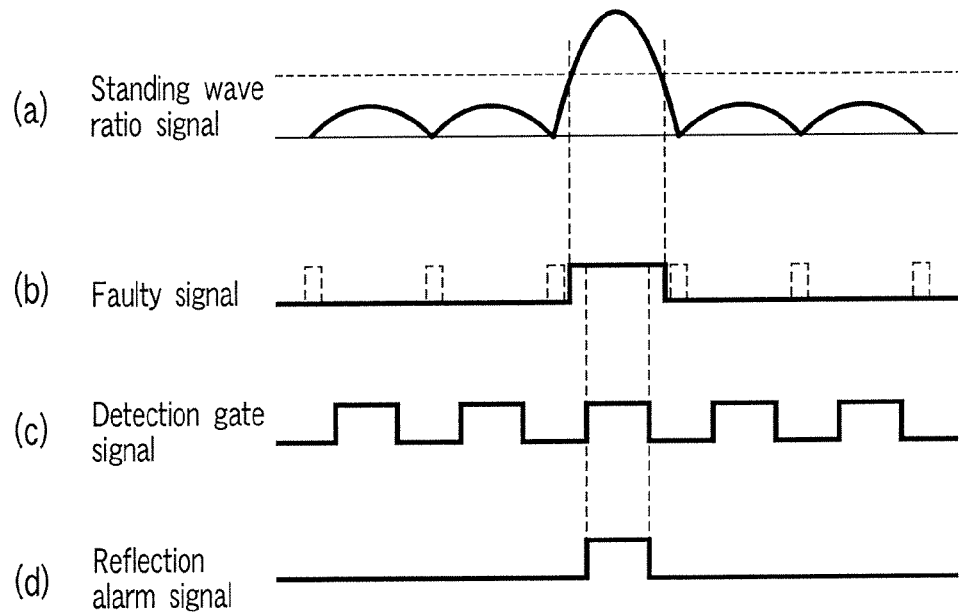
FIG. 4 is a schematic illustrating preferred processing of a standing wave ratio signal calculated by the signal generation circuit in the embodiment of the invention.

FIG. 4 shows a schematic view illustrating the processing of the standing wave ratio signal in the generation circuit 13 regarding the embodiment of the invention when the sideband antenna 30-9 becomes faulty. The generation circuit 13 generates a fault signal shown in FIG. 4 (*b*) by generating a pulse wave when a value of the standing wave ratio signal shown in FIG. 4 (*a*) exceeds a defined value (Block ST3*h*). Subsequently, the generation circuit 13 compares the timing at which the detection gate signal shown in FIG. 4 (*c*), which is set on the basis of the switching signals, is turned on with the timing at which a pulse wave of a fault signal is generated (Block ST3*i*), and determines whether or not the pulse wave of the fault signal exists when the detection gate signal is turned on (Block ST3*j*). If the pulse wave of the fault signal exists when the detection gate signal is turned on (Yes, in Block ST3*j*), the generation circuit 13 generates the reflection alarm signal shown in FIG. 4 (*d*) (Block ST3*k*), and outputs it to the modulation signal generation and antenna monitor circuit 14 (Block ST3*l*). After outputting, the processing of the generation circuit 13 advances to Block ST3*a*.

When the detection gate signal is turned on, and if the pulse wave of the fault signal does not exist (No, in Block ST3*j*), the processing of the generation circuit 13 advances to Block ST3*a*.

Figure 5:
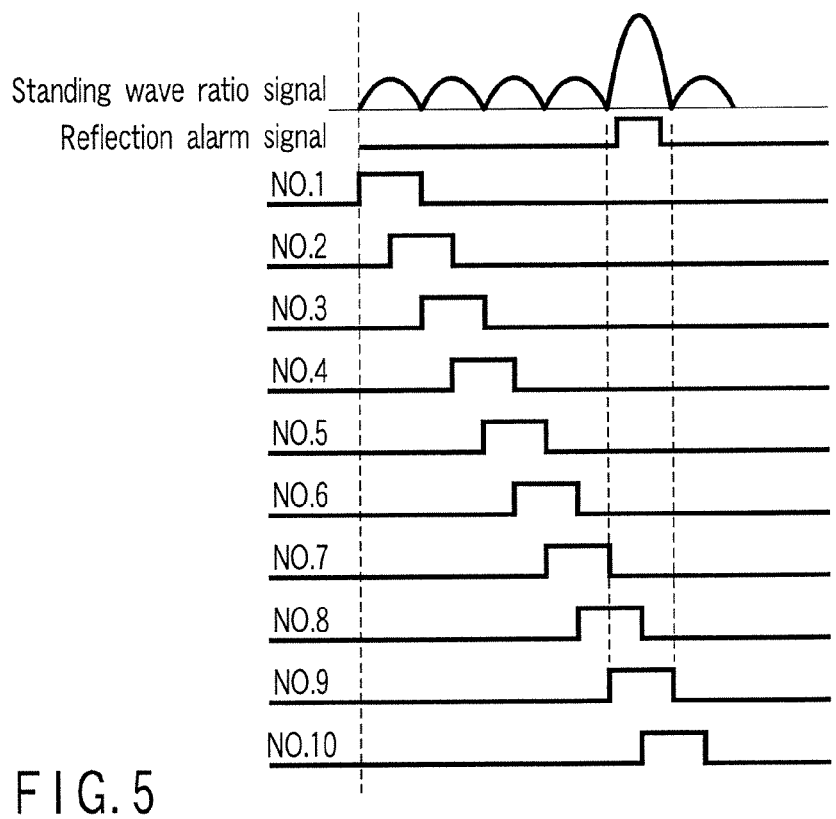
FIG. 5 is a schematic view illustrating a preferred detecting method of a faulty sideband antenna by a modulation signal generation and antenna monitor circuit in the embodiment of the invention.

The modulation signal generation and antenna monitor circuit 14 compares the switching signals to control the switching timing of the RF signals with the reflection alarm signal from the generation circuit 13 to detect which sideband antennas from which the increased reflected wave is transmitted. FIG. 5 shows a schematic view illustrating a detection method of a faulty sideband antenna by means of the modulation signal generation and antenna monitor circuit 14 regarding the embodiment of the invention. In the embodiment, since the pulse wave of the reflection alarm signal and a pulse wave of the No. 9 switching signal are generated simultaneously, it is recognized that the faulty sideband antenna is the sideband antenna 30-9.

According to this method, it is possible to specify a faulty cable from the combination of the reflection alarm signal and the corresponding sideband antenna number not only in the case of the occurrence of a fault to the sideband antenna but also even when a fault has occurred in the cables between the main device 10 and the distributor 20.

As mentioned above, in the configuration of the embodiment, the same number of directional couplers 12-1 to 12-4 as sideband transmitters installed in the main device 10 detect the reflected waves from the sideband antennas 30-1 to 30-48, and the signal generation circuit 13 measures their power levels. The DVOR apparatus detects a faulty sideband antenna by comparing the reflection alarm signal, which is obtained as the result of comparison between the progressive detection signal and the reflected wave detection signal, and the switching signals through the modulation signal generation and antenna monitor circuit 14.

Accordingly, in the present invention, by installing the same number of directional couplers as sideband transmitters, and a modulation signal generation and antenna monitor circuit 14 in the main device, the number of circuit components can be reduced and the configuration of the distributor can be simplified while maintaining the detection function for faulty sideband antennas. Therefore, the reduction in the engineering work cost, the miniaturization of the device, and the reduction in manufacturing cost can be achieved. Simplifying the configuration of the distributor makes it unnecessary for the cable supplying power sources to drive the antenna monitor circuit and the cable transmitting the monitor results of the reflected waves from the antenna monitor circuit outwardly. Thus, the cost of laying the cables can be reduced. Furthermore, since the directional couplers installed in the main device detect the reflected waves, by the combination of the sideband antenna numbers corresponding to the reflected wave detection signals, faults occurring in the cables between the main device and the distributor can be detected.

It is our intention that the invention be not limited to the specific details and representative embodiments shown and described herein, and in an implementation phase, this invention may be embodied in various forms without departing from the spirit or scope of the general inventive concept thereof. Various types of inventions can be formed by appropriately combining a plurality of constituent elements disclosed in the foregoing embodiments. Some elements, for example, may be omitted from the whole of the constituent elements shown in the embodiments mentioned above.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A Doppler VHF omidirectional radio range (DVOR) apparatus comprising:
   a main device comprising at least one RF sideband transmitter connected to at least one directional coupler, within the main device, which has an output connected to a signal generation circuit, within the main device, whose output is connected to a modulation signal generation and antenna monitor circuit, within the main device;
   a distributor connected by cable to the at least one directional coupler and which receives a progressive RF sideband signal from the at least one directional coupler and returns reflected RF sideband signal to the at least one directional coupler, the distributor being connected to, and receiving a switching signal from, the modulation signal generation and antenna monitor circuit, the switching signal driving the distributor; and
   a plurality of sideband antennas connected to, and receiving respective progressive RF sideband signals distributed spatially and temporally from, the distributor,
   the signal generation circuit providing comparison output signals representative of the power level differences between each progressive RF sideband signal and each progressive RF sideband signal's corresponding reflected RF sideband signal caused by reflections from one of the plurality of sideband antennas, as well as providing switching signals indicative of an identity of each sideband antenna from which each reflection is obtained, and
   the modulation signal generation and antenna monitor circuit processing the comparison output signals and the switching signals to provide an output identifying any faulty sideband antenna.

2. The DVOR apparatus according to claim 1, wherein the signal generation circuit provides, as each comparison output signal, a signal representative of the ratio of power levels of each progressive RF sideband signal and each progressive RF sideband signal's respective reflected RF sideband signal.

3. The DVOR apparatus according to claim 1, wherein the modulation signal generation and antenna monitor circuit processes the comparison output signals and the switching signals to identify a faulty transmission path from the directional coupler thereto.

4. The DVOR apparatus according to claim 1, wherein the main device comprising a plurality of RF sideband transmitters connected respectively to a corresponding plurality of directional couplers, each of which has an output connected to the signal generation circuit, and the distributor is connected by cable to each respective directional coupler.

5. The DVOR apparatus according to claim 4, wherein the signal generation circuit is arranged to provide, as each comparison output signal, a signal representative of the ratio of power levels of each progressive RF sideband signal and each progressive RF sideband signal's respective reflected RF sideband signal.

6. The DVOR apparatus according to claim 4, wherein the modulation signal generation and antenna monitor circuit processes the comparison output signals and the switching signals to identify a faulty transmission path from the directional coupler thereto.

7. A sideband antenna fault detecting method implemented using a Doppler VHF omnidirectional radio range (DVOR) apparatus including a main device having at least one RF sideband transmitter connected to at least one directional coupler which has an output connected to a signal generation circuit whose output is connected to a modulation signal generation and antenna monitor circuit, a distributor connected by cable to the at least one directional coupler and a plurality of sideband antennas, the method comprising:

receiving, at the distributor, a progressive RF sideband signal from the at least one directional coupler;

receiving, at the plurality of sideband antennas, respective progressive RF sideband signals distributed spatially and temporally from the distributor, returning, from the distributor, a reflected RF sideband signal to the at least one directional coupler;

receiving a switching signal, at the distributor, from the modulation signal generation and antenna monitor circuit, that drives the distributor; and providing, using the signal generation circuit, comparison output signals representative of the power level differences between each progressive RF sideband signal and a corresponding reflected RF sideband signal caused by reflections from one of the sideband antennas, providing, using the signal generation circuit, switching signals indicative of the identity of each sideband antenna from which each reflection is obtained; and processing, using the modulation signal generation and antenna monitor circuit, the comparison output signals and the switching signals to provide an output identifying any faulty sideband antenna.

8. The sideband antenna fault detecting method according to claim 7, wherein the signal generation circuit provides, as each comparison output signal, a signal representative of the ratio of power levels of each progressive RF sideband signal and each progressive RF sideband signal's respective reflected RF sideband signal.

9. The sideband antenna fault detecting method according to claim 7, wherein the modulation signal generation and antenna monitor circuit processes the comparison output signals and the switching signals to identify a faulty transmission path from the directional coupler thereto.

10. The sideband antenna fault detecting method according to claim 7, wherein the main device comprising a plurality of RF sideband transmitters connected respectively to a corresponding plurality of directional couplers, each of which has an output connected to the signal generation circuit, and the distributor is connected by cable to each respective directional coupler.

11. The sideband antenna fault detecting method according to claim 10, wherein the signal generation circuit is arranged to provide, as each comparison output signal, a signal representative of the ratio of power levels of each progressive RF sideband signal and each progressive RF sideband signal's respective reflected RF sideband signal.

12. The sideband antenna fault detecting method according to claim 10, wherein the modulation signal generation and antenna monitor circuit processes the comparison output signals and the switching signals to identify a faulty transmission path from the directional coupler thereto.

\* \* \* \* \*